United States Patent [19]

Sampson

[11] Patent Number: 4,714,090

[45] Date of Patent: Dec. 22, 1987

[54] MIXING APPARATUS FOR GASES

[75] Inventor: David C. Sampson, Cowling, England

[73] Assignee: The BOC Group plc, Windlesham, England

[21] Appl. No.: 916,357

[22] Filed: Oct. 8, 1986

[30] Foreign Application Priority Data

Oct. 10, 1985 [GB] United Kingdom ................. 8525058

[51] Int. Cl.⁴ ...................... F16K 11/00; F16K 11/065

[52] U.S. Cl. .................................... 137/636; 137/867; 137/897; 137/898; 137/607

[58] Field of Search .................. 137/636, 636.1, 636.3, 137/607, 867, 896, 897, 898, 88, 100

[56] References Cited

U.S. PATENT DOCUMENTS

| | | | |
|---|---|---|---|
| Re. 21,873 | 8/1941 | Hermann | 137/898 |
| 1,743,278 | 1/1930 | Lawless | 137/636 |
| 2,171,992 | 9/1939 | Rantine | 137/636 |
| 2,573,716 | 11/1951 | Kirtley | 137/636 |
| 2,575,940 | 11/1951 | Brown, Jr. | 137/898 |
| 2,726,679 | 12/1955 | Countryman | 137/636 |
| 3,207,183 | 9/1965 | Stuhl | 137/636.1 |
| 3,739,799 | 6/1973 | Bickford et al. | 137/100 |

FOREIGN PATENT DOCUMENTS

| | | | |
|---|---|---|---|
| 234188 | 6/1961 | Australia | 137/636.1 |

*Primary Examiner*—George L. Walton
*Attorney, Agent, or Firm*—Roger M. Rathbun; Larry R. Cassett

[57] ABSTRACT

An apparatus 1 for mixing first and second gases includes first and second valves 2, 3 each having a stem 14 the axial movement of which controls the flow of the gases through their respective valves. Each valve stem has one end engaging a control surface 16 of a thrust plate 18 mounted for axial and pivotal movement on a shaft 20. Means including a plunger 26 is provided for pivoting the thrust 18 so that one valve stem is moved axially relative to the other thereby increasing the rate of flow of one gas through its respective valve while concomitantly decreasing the rate of flow of the other gas through its respective valve to vary the relative proportion of the gases without varying the total flow rate. Total flow adjuster 34 bears on the plunger 26 for moving the thrust plate 18 axially towards and away from the valve stems 14 thereby to vary the total rate of flow of the gases without varying the relative proportions of each gas flowing through its respective valve.

8 Claims, 4 Drawing Figures

MIXING APPARATUS FOR GASES

BACKGROUND OF THE INVENTION

The present invention relates to apparatus for mixing a plurality of gases and in particular apparatus for mixing a plurality of medical gases and forming part of an anaesthesia machine.

Anaesthesia machines of the continuous flow type are the most widely used today and are employed in conjunction with a breathing circuit to provide a complete anaesthesia system. Such machines blend or mix a gaseous anesthetic with oxygen in proportional amounts to produce a gaseous mixture having a desired flow rate. A typical example of a continuous anaesthesia machine is disclosed in U.S. Pat. No. 3,739,799 which includes at least two flowmeters operable to measure and visually indicate the rate of flow of respective gaseous components. A mixture control valve is operable to increase the rate of flow of either of said components to its associated flowmeter and simultaneously decrease the rate of flow of the other of said components to its associated flowmeter to vary the relative proportions of said components substantially without varying the total flow of said components. A total flow control means is operable to vary the total rate of flow of the said components substantially without varying the relative proportions of said components.

This known anaesthesia machine has proved to be highly successful but suffers from the disadvantage that the mixture control valve is difficult to manufacture and calibrate. The mixture control valve comprises a pair of needle valves extending axially outwardly from opposite sides of a calibrated disc or dial. One of the needle valves is provided with a threaded portion received in a threaded bore for axially moving the needle valves relative to ports surrounded by valve seatings. The distal ends of the needle valves are each provided with a tapered surface which is adapted to co-operate with its respective seating to close or open a port when the mixture control dial is turned. When the dial is turned in one direction the axial movement of the needle valves causes one valve to distance itself from its seating whilst concomitantly allowing the other needle valve to approach its seating.

In this manner increasing the concentration of one gaseous component and the individual flowrate thereof reduces the concentration of the other gaseous component and the flowrate thereof by an equal amount thereby varying the proportions without effecting the total flow rate.

SUMMARY OF THE INVENTION

It is an aim of the present invention to provide an apparatus for mixing a plurality of gases which is suitable for inclusion in an anaesthesia machine, which is relatively easy to manufacture, assemble and calibrate and which is capable of operating over a wider flow range than previously attainable.

According to the present invention, an apparatus for mixing first and second gases comprises first and second valves each having a valve stem the axial movement of which controls the flow of the first and second gases through their respective first and second valves, each valve stem having one end engaging a control surface of a thrust plate mounted for axial and pivotal movement on a shaft, a plunger for pivoting the thrust plate so that one valve stem is moved axially relative to the other thereby increasing the rate of flow of one gas through its respective valve whilst concomitantly decreasing the rate of flow of the other gas through its respective valve to vary the relative proportions of the gases without varying their total flow rate, and means for moving the thrust plate axially towards and away from the valve stems thereby to vary the total rate of flow of the gases without varying the relative proportion of each gas flowing through its respective valve.

BRIEF DESCRIPTION OF DRAWINGS

Embodiments of the invention will now be described, by way of example, reference being made to the Figures of the accompanying diagrammatic drawings in which.

DESCRIPTION OF PREFERRED EMBODIMENT

Figure 1:
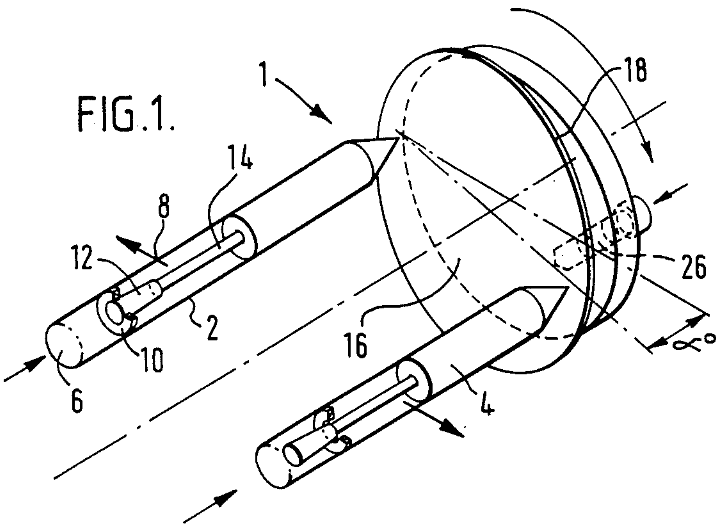
FIG. 1 is a schematic, perspective sketch of part of an apparatus for mixing first and second gases.
Figure 2:
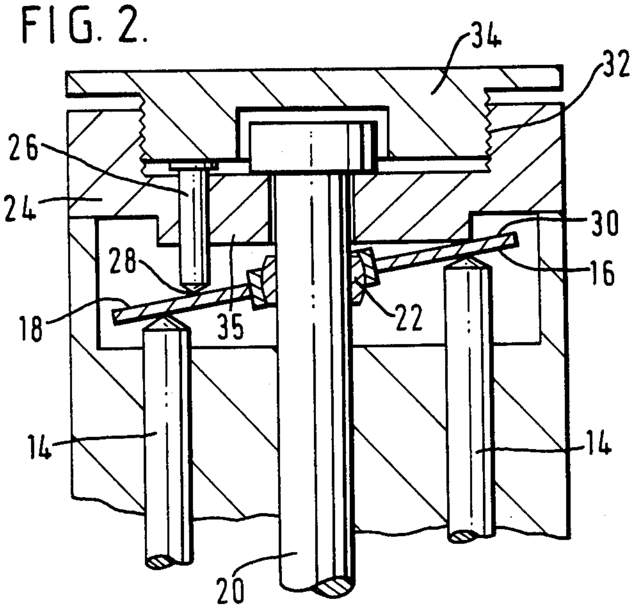
FIG. 2 is a cross-section of part of the apparatus of FIG. 1.

Referring first to FIGS. 1 and 2, an apparatus 1 for mixing first and second gases includes a first valve 2 and a second valve 4. The valves 2, 4 are substantially identical and for convenience only valve 2 will be described in detail.

Valve 2 includes an inlet 6 for the first gas, for example, oxygen and an outlet 8 spaced from the inlet 6. Between the inlet 6 and the outlet 8 is a valve seat 10 cooperating with a valve head 12 the axial movement of which relative to the seat 10 will control the rate of flow of oxygen from the inlet 6 to the outlet 8. The valve head 12 forms part of a spring loaded axially movable valve stem 14 the distal end of which is tapered and bears against a control surface 16 of a thrust plate 18. The valve stem 14 is spring loaded to bias the valve head 12 to its closed position relative to the seat 10.

The thrust plate 18 is mounted on a shaft 20 by means of a spherical bearing 22 and can pivot about the bearing and also move axially along the shaft with the bearing 22.

Mounted for rotary movement on the shaft 20 is a member 24 through which extends a plunger 26. As shown, the plunger 26 is movable axially through a bore in the member 24 and at one end 28 bears against a surface 30 of the thrust plate 18.

The upper (as shown in FIG. 2) surface of the member 24 has a threaded counterbore 32 which receives a total flow adjuster 34, The lower (as shown in FIG. 2) surface of the member 24 has a central boss 35.

In use, when it is desired to alter the respective proportions of the first and second gases the angular position of the plunger 26 is adjusted relative to the valve stems 14 by rotating the member 24 on the shaft 20. The angular position of the plunger 26 relative to the two valve stems 14 apportions their opening by an amount inversely proportional to the angular distance of the plunger 26 from the respective valve stems 14.

As shown in FIG. 2 that part of the surface 30 opposite the plunger 26 engages the periphery of boss 35 and acts as a pivot point for the thrust plate 18.

If the valve heads 12 are designed such that the flow characteristics are linear with respect to valve stem displacement and matched for each gas to produce a coincident gas flow profile then a 50% setting of mixture will be achieved with the plunger 26 midway between the valve stems 14.

When it is desired to alter the total flow of the gases passing through the respective valves 2, 4 whilst keeping their proportions constant then the total flow adjuster 34 is screwed in or out of the threaded counterbore 32 thus moving the plunger 26 axially through member 24 and causing the thrust plate 18 and bearing 22 to move axially along the shaft 20. Axial movement of the thrust plate 18 will cause a concomitant movement of the valve stems 14.

The gases on leaving the outlets 8 of their respective valves 2, 4 will pass to respective flowmeters (not shown) as is well known in the art.

Figure 3:
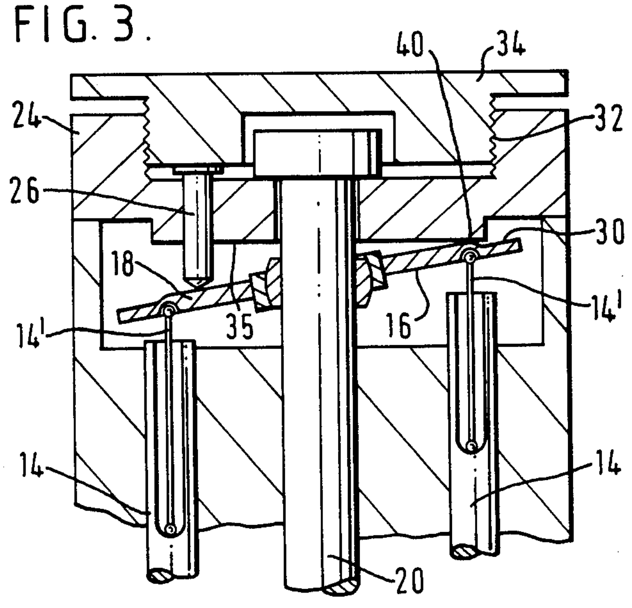
FIG. 3 is a cross-section similar to FIG. 2 but illustrating modifications to the apparatus.

Referring now to FIG. 3, the apparatus of FIGS. 1 and 2 can be modified slightly in that each valve stem 14 includes a push rod 14' which is articulated at one end to the remainder of the valve stem 14 and at its opposite end is articulated to the control surface 16 of the thrust plate 18. Furthermore, the surface 30 of the thrust plate 18 can be profiled as at 40. The use of the articulated push rods 14' and the profiling on the surface 30 helps to generate a linear profile for the control surface 16. It will be seen that the thrust plate 18 pivots at a point fixed opposite the plunger 26 where the profile 40 engages the boss 35.

Although, in the embodiment illustrated in FIGS. 1 and 2 and the modification illustrated in FIG. 3 only one plunger 26 is shown, in fact two plungers 26 can be used spaced along an arc of the same radius. It has been found that the use of two spaced plungers helps the stability of the thrust plate 18 when being pivoted.

Figure 4:
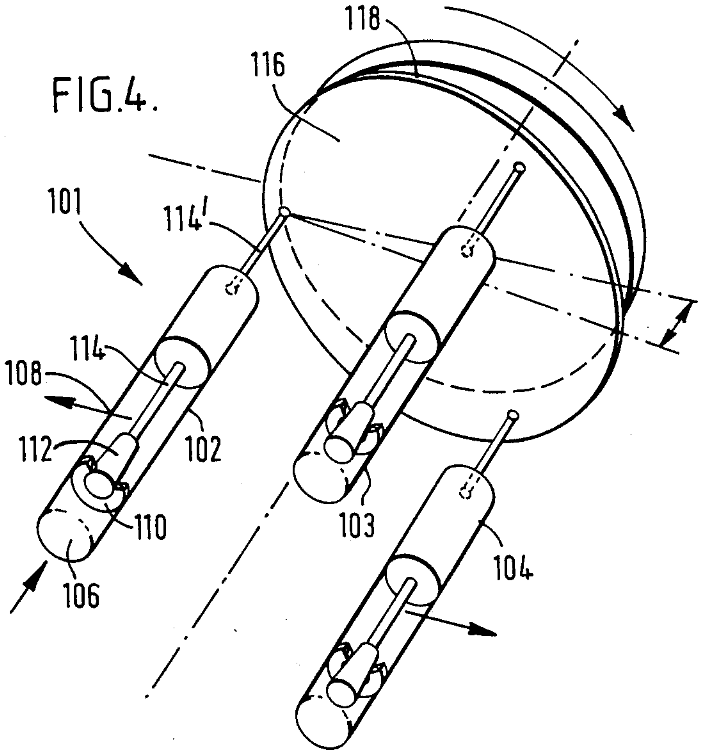
FIG. 4 is a schematic, perspective sketch of part of an apparatus for mixing two of any three separate gases.

In a second embodiment shown in FIG. 4, an apparatus 101 for mixing any two of three different gases includes first, second and third valves 102, 103 and 104. The valves 102, 103 and 104 are substantially identical and for convenience only valve 102 will be described in detail. Valve 102 includes an inlet 106 for the first gas, for example oxygen and an outlet 108 spaced from the inlet 106. Between the inlet 106 an outlet 108 is a valve seat 110 which cooperates with a valve head 112 the axial movement of which relative to the valve seat 110 controls the rate of flow of oxygen from the inlet 106 to the outlet 108. The valve head 112 forms part of a spring loaded axially movable valve stem 114. A push rod 114' forms part of the valve stem 114 and is articulated at one end to the remainder of the valve stem 114 and at its opposite end with a control surface 116 of a thrust plate 118.

The remainder of the apparatus 101 which is not shown is substantially identical to that described with reference to FIGS. 1, 2 and 3 except that thrust plate 118 does not pivot on a profile formed on its rear surface; instead it pivots on the in-active valve (valve 102 as shown) the gas flow being proportioned between the remaining two active valves 103, 104.

As illustrated in FIG. 4 valves 103 and 104 are active whilst valve 102 is the pivot. Rotation of the member 24 (not shown) and hence the plunger 26 towards valve 103 opens this further whilst concomitantly closing valve 104. Further rotation from valve 103 towards 102 opens valve 102 as valve 103 closes, valve 104 remaining shut.

It will be evident that many of the parts forming the apparatus illustrated in the Figures are circular or spherical and therefore relatively easy to manufacture to close tolerances. Thus, a more economic apparatus for mixing gases is described than as heretofor been possible.

I claim:

1. A gas machine for mixing a desired concentration of first and second gases for delivery to a patient, said machine comprising a valve body, said valve body having first and second valves each having a valve stem the axial movement of which controls the flow of the first and second gases through their respective first and second valves, each valve stem having one end engaging a control surface of a thrust plate mounted for axial and pivotal movement on a support shaft, a bearing means surrounding said support shaft, said bearing means allows said thrust plate to pivot and slide axially along said support shaft, a first actuator means on said valve body having at least one variable plunger that is disposed within said first actuator means and being separate from said thrust plate but in abutting engagement with said thrust plate, said first actuator means variably moving the plunger selectively along the control surface of said thrust plate for pivoting the thrust plate about said shaft so that one valve stem is moved axially relative to the other thereby increasing the rate of flow of one gas through its respective valve whilst concomitantly decreasing the rate of flow of the other gas through its respective valve to vary the relative proportions of the gases without varying their total flow rate, and a second actuator means disposed within said first actuator means for adjustably engaging and abutting said at least one plunger for moving the thrust plate axially along said shaft towards and away from the valve stems thereby to vary the total rate of flow of the gases without varying the relative proportion of each gas flowing through its respective valve.

2. An apparatus as claimed in claim 1, in which the thrust plate is mounted for pivotal movement on the shaft by bearing means which includes a spherical bearing, and in which the plunger engages a surface of the thrust plate, means being provided for moving the plunger across said surface thereby to pivot the thrust plate.

3. An apparatus as claimed in claim 2, in which said second actuator means is a member rotatable about the shaft, the plunger being mounted for rotatable movement therewith, the plunger being axially movable relative to the member.

4. An apparatus as claimed in claim 3, in which said actuator is a total flow adjuster which is mounted for axial movement on said member, said total flow adjuster bearing on the plunger and causing concomitant axial movement of the plunger relative to the member.

5. An apparatus as claimed in claim 1, in which each valve stem includes a push rod articulated at one end to the remainder of the valve stem and at its opposite end to the control surface of the thrust plate.

6. An apparatus as claimed in claim 5, in which the surface of the thrust plate engaged by the plunger is profiled such that a part of the profile opposite the plunger acts as a pivot point when engaging a boss on the member.

7. An apparatus as claimed in claim 6, in which two plungers are provided spaced along an arc of the same radius on the member and in which the profiled surface of the thrust plate engages the boss on the member diametrically opposite a point intermediate the two plungers.

8. An apparatus as claimed in claim 1, in which first, second and third valves are provided each associated with first, second and third gases respectively, one valve remaining closed during pivotal movement of the thrust plate which acts upon the valve stems of the remaining two valves to proportion the gases passing through said remaining two valves to a desired ratio without varying their total flow rate, the valve stem of the closed valve at its end engaging the thrust plate acting as a pivot point for the thrust plate.

* * * * *